US009348982B2

(12) United States Patent
Negoro et al.

(10) Patent No.: US 9,348,982 B2
(45) Date of Patent: May 24, 2016

(54) INFORMATION PROCESSING SYSTEM, AN OPERATING DEVICE, AND A COMPUTER-READABLE STORAGE MEDIUM

(71) Applicants: Shigeo Negoro, Tokyo (JP); Yoh Masuyama, Kanagawa (JP); Keisuke Iwasa, Kanagawa (JP); Tadashi Nagata, Kanagawa (JP); Kiyohiko Shinomiya, Tokyo (JP); Yutaka Yagiura, Kanagawa (JP); Tomoki Shibukawa, Kanagawa (JP)

(72) Inventors: Shigeo Negoro, Tokyo (JP); Yoh Masuyama, Kanagawa (JP); Keisuke Iwasa, Kanagawa (JP); Tadashi Nagata, Kanagawa (JP); Kiyohiko Shinomiya, Tokyo (JP); Yutaka Yagiura, Kanagawa (JP); Tomoki Shibukawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/975,495

(22) Filed: Aug. 26, 2013

(65) Prior Publication Data

US 2014/0082747 A1    Mar. 20, 2014

(30) Foreign Application Priority Data

Sep. 14, 2012 (JP) ................................. 2012-203676

(51) Int. Cl.
*G06F 21/31* (2013.01)
*G06F 21/60* (2013.01)
*G06F 21/62* (2013.01)
*G06F 21/44* (2013.01)

(52) U.S. Cl.
CPC .............. *G06F 21/31* (2013.01); *G06F 21/608* (2013.01); *G06F 21/629* (2013.01); *G06F 21/44* (2013.01)

(58) Field of Classification Search
CPC ........................................................ G06F 21/31
USPC ........................................................... 726/28
See application file for complete search history.

(56) References Cited

U.S. PATENT DOCUMENTS 5,410,419 A * 4/1995 Muramatsu .......... G03G 15/221
                                                              358/468
5,689,718 A * 11/1997 Sakurai et al. ................ 715/205

(Continued)

FOREIGN PATENT DOCUMENTS

CN          1095174 A       11/1994
JP          2005-303376     10/2005

(Continued)

OTHER PUBLICATIONS

Chinese Office Action issued Dec. 28, 2015 in Chinese Patent Application No. 2013104139042 with translation.

*Primary Examiner* — Hadi Armouche
*Assistant Examiner* — Shahriar Zarrineh
(74) *Attorney, Agent, or Firm* — Oblon, McClelland, Maier & Neustadt, L.L.P.

(57) ABSTRACT

An information processing system, an operating device, and computer-readable storage medium. The operating device acquires, from an operation application program installed in the operating device, function information that indicates a function provided by the operation application program, acquires use authority information that is stored in a use-authority information storage device and is related to user identification information on an operating user that operates the operating device, determines whether the operating user has authority to use the function provided by the operation application program by using the use authority information acquired and the function information acquired, and performs the function when the operating user has the authority to use the function.

9 Claims, 7 Drawing Sheets

(56) References Cited

U.S. PATENT DOCUMENTS

| | | | |
|---|---|---|---|
| 7,694,137 B2 * | 4/2010 | Matsuya | H04L 63/104 380/231 |
| 8,184,312 B2 | 5/2012 | Tsuboi et al. | |
| 8,510,856 B2 * | 8/2013 | Murakawa | 726/28 |
| 2002/0165769 A1 * | 11/2002 | Ogaki | G06Q 20/20 705/14.36 |
| 2004/0212823 A1 * | 10/2004 | Chavers et al. | 358/1.15 |
| 2005/0183141 A1 * | 8/2005 | Sawada | G03G 21/04 726/16 |
| 2006/0212497 A1 * | 9/2006 | Tomita | G06F 17/30011 |
| 2006/0212715 A1 * | 9/2006 | Terao | 713/184 |
| 2006/0227377 A1 * | 10/2006 | Doi | G03G 15/5012 358/1.16 |
| 2006/0256370 A1 * | 11/2006 | Murakawa | 358/1.15 |
| 2007/0214508 A1 * | 9/2007 | Fukui et al. | 726/28 |
| 2007/0253013 A1 * | 11/2007 | Shudo | G06F 21/608 358/1.14 |
| 2008/0022087 A1 * | 1/2008 | Tsujimoto | G06F 21/608 713/155 |
| 2008/0085132 A1 * | 4/2008 | Asada | G03G 15/5016 399/83 |
| 2009/0064320 A1 * | 3/2009 | Okamoto | G06F 21/32 726/19 |
| 2009/0282465 A1 * | 11/2009 | Narita | 726/6 |
| 2009/0313683 A1 * | 12/2009 | Murakawa | G06F 21/629 726/5 |
| 2010/0157347 A1 * | 6/2010 | Yoshimura et al. | 358/1.13 |
| 2010/0235888 A1 * | 9/2010 | Miyamoto | 726/4 |
| 2010/0265532 A1 * | 10/2010 | Katahira | 358/1.14 |
| 2010/0299737 A1 * | 11/2010 | Ueno | 726/7 |
| 2010/0321716 A1 * | 12/2010 | Takeo | G06F 3/121 358/1.14 |
| 2011/0002003 A1 * | 1/2011 | Suwabe | G06F 21/629 358/1.14 |
| 2011/0010776 A1 * | 1/2011 | Ceraolo | 726/28 |
| 2011/0067026 A1 * | 3/2011 | Nishio | 718/100 |
| 2011/0157643 A1 * | 6/2011 | Shozaki | 358/1.15 |
| 2011/0161867 A1 * | 6/2011 | Tomita et al. | 715/785 |
| 2011/0279856 A1 | 11/2011 | Yamazaki | |
| 2012/0044523 A1 * | 2/2012 | Kim | 358/1.15 |
| 2012/0203382 A1 * | 8/2012 | Nourian | A01G 25/16 700/284 |
| 2012/0307286 A1 * | 12/2012 | Osaki | G06F 21/608 358/1.14 |

FOREIGN PATENT DOCUMENTS

| | | |
|---|---|---|
| JP | 4016996 | 9/2007 |
| JP | 2009-043132 | 2/2009 |
| JP | 4745657 | 5/2011 |
| JP | 2011-238136 | 11/2011 |

* cited by examiner

FUNCTION INFORMATION

| APP ID | PROVIDED FUNCTION |
|---|---|
| FIRST APP | COPIER |

FUNCTION INFORMATION

| APP ID | PROVIDED FUNCTION |
|---|---|
| SECOND APP | COPIER, PRINTER, SCANNER |

| USER NAME | PASSWORD | USE AUTHORITY INFORMATION | | |
|---|---|---|---|---|
| | | COPIER | PRINTER | SCANNER |
| MR. A | 1234 | ○ | × | × |
| MR. B | 5678 | × | ○ | × |
| ⋮ | ⋮ | ⋮ | ⋮ | ⋮ |

FIG.5

AUTHENTICATION TICKET

| USER NAME | PASSWORD | COPIER | PRINTER | SCANNER |
|---|---|---|---|---|
| | | ○ | × | × |

FIG.8

| PROVIDED FUNCTION OF OPERATION APP | AUTHORITY TO USE MAIN BODY APP |
|---|---|
| COPIER | COPIER AND PRINTER |
| PRINTER | COPIER, PRINTER, OR FAX |
| FAX | COPIER, PRINTER, AND FAX |

FIG.9

| PROVIDED FUNCTION OF OPERATION APP | AUTHORITY TO USE MAIN BODY APP |
|---|---|
| MAP | COPIER |
| CALENDAR | COPIER, PRINTER, OR FAX |

INFORMATION PROCESSING SYSTEM, AN OPERATING DEVICE, AND A COMPUTER-READABLE STORAGE MEDIUM

CROSS-REFERENCE TO RELATED APPLICATIONS

The present application claims priority to and incorporates by reference the entire contents of Japanese Patent Application No. 2012-203676 filed in Japan on Sep. 14, 2012.

BACKGROUND OF THE INVENTION

1. Field of the Invention

The present invention relates to an image processing system, an operating device, and a program.

2. Description of the Related Art

According to a conventionally-known technology, when a new application program (hereafter, simply referred to as an application) is installed in an image forming apparatus, the authority to use the new application is set for each user. For example, Japanese Patent No. 4745657 discloses a technology related to the authority of use, i.e., the technology in which, when a new function is added to an apparatus, the restriction on the use of the added function is appropriately set.

Recently, image forming apparatuses have been developed in which an apparatus main body and an operating device are controlled by different controllers.

In the above-described image forming apparatus in which the apparatus main body and the operating device are controlled by different controllers, a new application to be executed by the operating device is sometimes added to the image forming apparatus. In the above case, there is the need for the technology for efficiently and appropriately setting the restriction on the use of the new application without the need of the user operation, or the like, for settings.

The present invention has been made in consideration of the foregoing and has an object to provide an image processing system, an operating device, and a program by which it is possible to efficiently and appropriately set the restriction on the use of the application installed in the operating device without the need of the user operation, or the like, for settings.

SUMMARY OF THE INVENTION

It is an object of the present invention to at least partially solve the problems in the conventional technology.

According to an aspect of the invention, an information processing system is provided. The information processing system includes an operating device for receiving an operation from a user, and an information processing main body device that performs information processing in response to the operation from the user, each of the operating device and the information processing main body device is controlled by using a computer. The operating device includes: an application control unit configured to acquire function information of at least one of application program installed in the operation device; and a use-authority determination unit configured to receive the operation from the user and notice to the application control unit. The information processing main body device includes an authentication unit configured to submit to the use-authority determination unit a user authentication result including use-authority information indicating that the user is allowed to use the application program. The use-authority determination unit determines whether or not the user is allowed to use the at least one of the application program on the basis of the function information and the use-authority information.

According to another aspect of the invention, an operating device for receiving an operation from a user and communicating with a main body device is provided. The operating device includes: a function-information acquiring unit that acquires function information of at least one of an application program installed in the operating device; a use-authority information acquiring unit that acquires, from the main body, use-authority information that the user is provided for the at least one of the application program; the use-authority determination unit determines whether or not the user is allowed to use the at least one of the application program on the basis of the function information and the use-authority information; and the application managing unit configured to execute the application program that the user has use-authority thereof in response to an execution instruction by the user.

According to further aspect of the invention, a computer readable medium comprising the computer executable instructions configured to perform a method for using an operating device for receiving an operation from a user and communicating with a main body device is provided. The method comprising: acquiring function information of at least one of an application program installed in the operating device; acquiring, from the main body, use-authority information that the user is provided for the at least one of the application program; determining whether or not the user is allowed to use the at least one of the application program on the basis of the function information and the use-authority information; and executing the application program that the user has use-authority thereof in response to an execution instruction by the user.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of an image processing system, an operating device, and a program are explained in detail below with reference to the accompanying drawings.

First Embodiment

Figure 1:
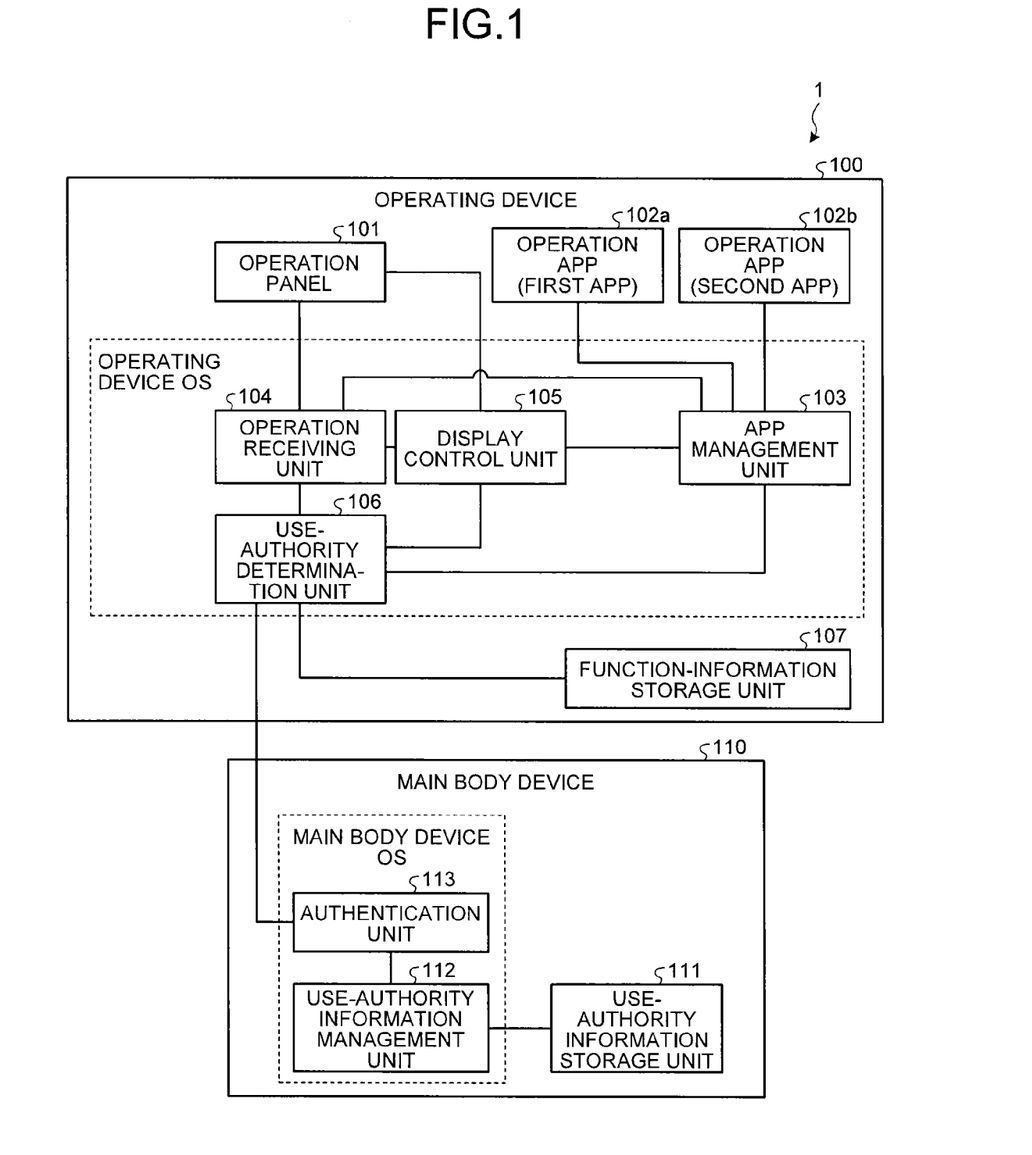
FIG. 1 is a block diagram that illustrates the configuration of an image forming system.

FIG. 1 is a block diagram that illustrates the configuration of an image forming system 1 according to a first embodiment. The image forming system 1 includes an operating device 100 that is an operating device and a main body device 110 that is an image processing main body unit. The operating device is a device that receives user operations. The operating device 100 according to the present embodiment also controls displaying various types of information on the display screen, as described below. The main body device 110 is a device that performs image processing and image formation in the image forming system 1.

The operating device 100 and the main body device 110 are controlled by different OSs. Specifically, the operating device 100 has the operating device OS installed therein, and the main body device 110 has the main body device OS installed therein.

The operating device 100 includes an operation panel 101, operation application programs (hereafter, referred to as the operation apps) 102a, 102b, an app management unit 103, an operation receiving unit 104, a display control unit 105, a use-authority determination unit 106, and a function-information storage unit 107. The app management unit 103, the operation receiving unit 104, the display control unit 105, and the use-authority determination unit 106 are implemented by the operating device OS.

The operation panel 101 receives an input of operation from a user. Moreover, the operation panel 101 includes a display screen so as to display various types of information as a display unit.

The operation apps 102a and 102b are the applications executed on the operating device 100. According to the present embodiment, the operating device 100 has the first app 102a and the second app 102b installed therein as the operation apps. The operation apps include the ones for providing various functions of, for example, copier, printer, scanner, or the like, and the operating device 100 can have various operation apps installed therein.

The number of operation apps installed in the operating device 100 is not limited to that in the embodiment. Furthermore, new operation apps are installed in or uninstalled from the operating device 100 as appropriate.

The app management unit 103 manages the operation apps 102a and 102b. For example, the app management unit 103 acquires, from each of the operation apps 102a and 102b installed in the operating device 100, function information that indicates provided function, i.e., the function provided by each of the operation apps 102a and 102b, and then writes the function information in the function-information storage unit 107. That is, the app management unit 103 functions as a function-information acquiring unit.

If each of the operation apps 102a and 102b is uninstalled, the function information on each of the operation apps 102a and 102b, which is stored in the function-information storage unit 107, is accordingly deleted from the function-information storage unit 107. Thus, it is possible to reduce memory consumption.

Figure 2:
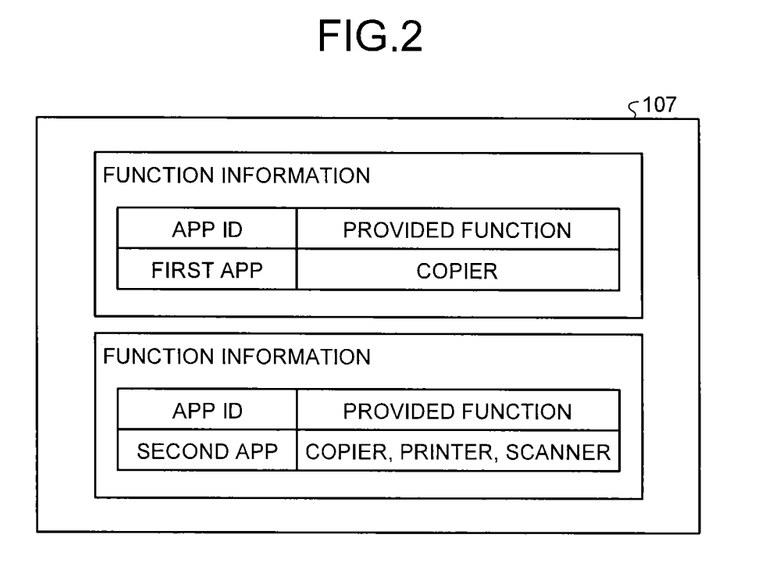
FIG. 2 is a diagram that schematically illustrates the data structure of a function-information storage unit.

FIG. 2 is a diagram that schematically illustrates the data structure of the function-information storage unit 107. The function-information storage unit 107 stores therein the function information on each of the operation apps 102a and 102b installed in the operating device 100. As illustrated in FIG. 2, the function information includes the app ID (the first app, the second app) that is the information for identifying the operation app and includes information that indicates the provided function of the operation app. In the example illustrated in FIG. 2, the function information on the first app includes the app ID "first app" of the operation app and includes the provided function "copier". Moreover, the function information on the second app includes the app ID "second app" and the provided functions "copier, printer, scanner".

Reference is made back to FIG. 1. The operation receiving unit 104 receives information that is input when a user operates the operation panel 101. The operation receiving unit 104 receives an input of information, such as the name of a user, password, or the like. The operation receiving unit 104 also receives an input of an instruction to start up the operation app, or the like. The display control unit 105 controls displaying information on the operation panel 101.

The use-authority determination unit 106 uses the information acquired from the main body device 110 and the information stored in the function-information storage unit 107 to determine whether the operating user who operates the operation panel 101 has the authority to use the function provided by the operation apps 102a and 102b installed in the operating device 100. That is, the use-authority determination unit 106 also functions as a use-authority information acquiring unit.

The main body device 110 includes a use-authority information storage unit 111, a use-authority information management unit 112, and an authentication unit 113. The use-authority information storage unit 111 stores therein use authority information. Here, the use authority information is the information as to whether each user has the authority to use the main body function of the main body device 110, and the information is defined for each user. The use-authority information management unit 112 and the authentication unit 113 are implemented by the main body device OS.

Figure 3:
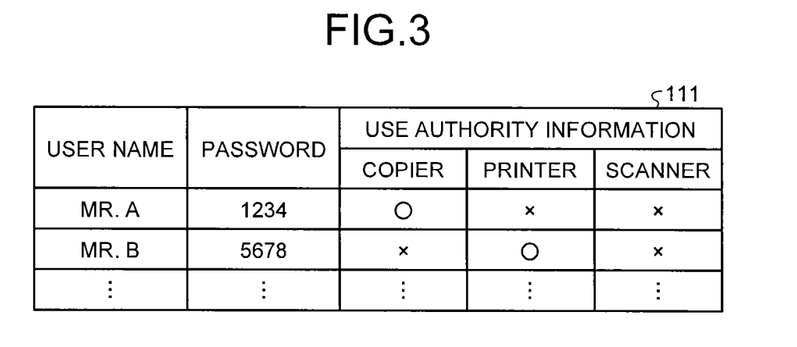
FIG. 3 is a diagram that schematically illustrates the data structure of a use-authority information storage unit.

FIG. 3 is a diagram that schematically illustrates the data structure of the use-authority information storage unit 111. Specifically, the use-authority information storage unit 111 stores the use authority information that is related to the user name and the password. In the example illustrated in FIG. 3, the function information related to the user name "Mr. A" indicates that the user has the authority to use the copier function of the main body device 110 but does not have the authority to use the printer and scanner functions of the main body device 110.

The use-authority information management unit 112 manages the use-authority information storage unit 111. The authentication unit 113 acquires, from the operating device 100, the user name and the password that are input when the user operates the operation panel 101, compares them with the combination of the user name and the password that are stored in the use-authority information storage unit 111, thereby authenticating the operating user.

Figure 4:
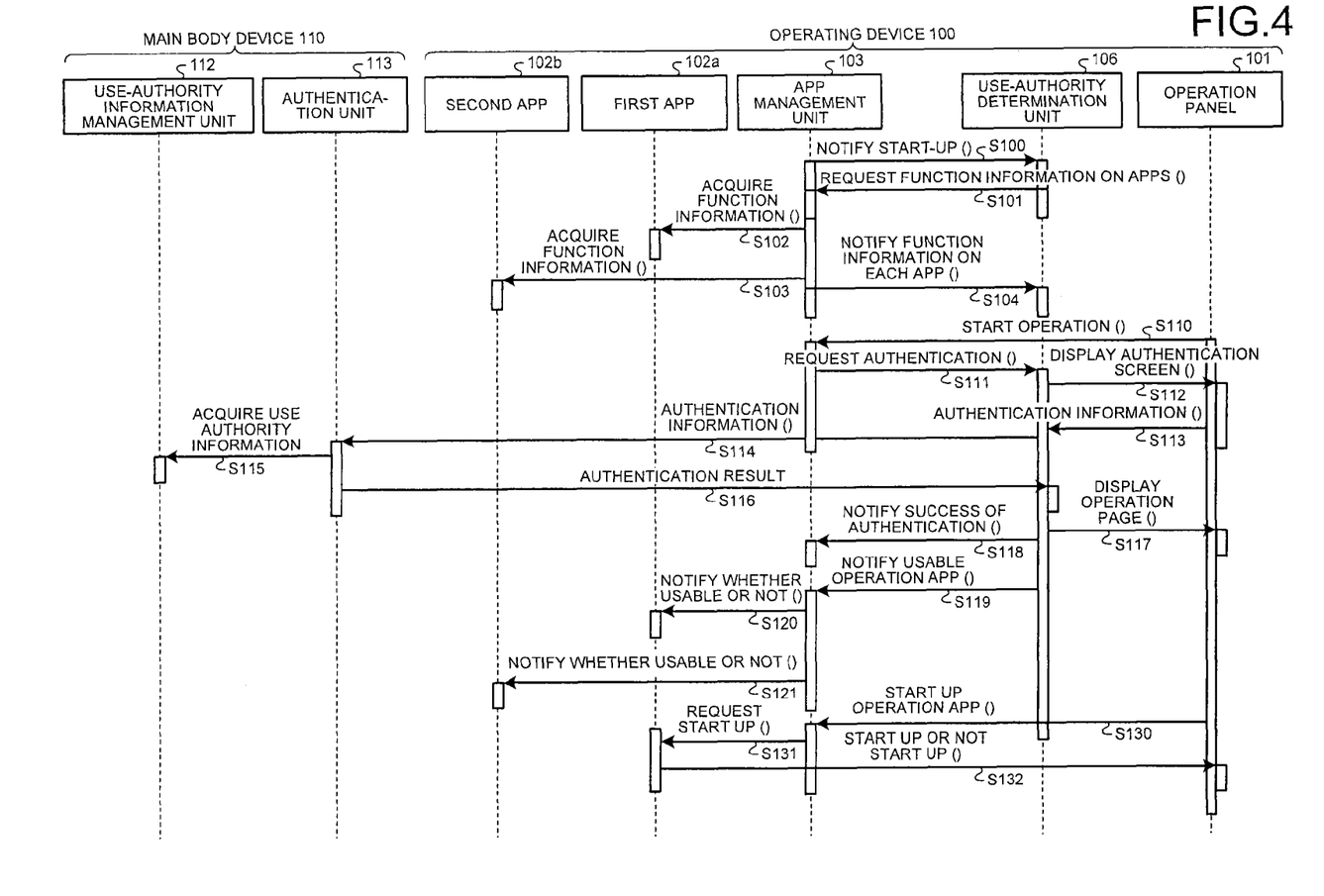
FIG. 4 is a sequence diagram that illustrates the process performed by the image forming system.

FIG. 4 is a sequence diagram that illustrates the process performed by the image forming system 1. When the image forming system 1 is started up, the app management unit 103 outputs the start-up notification to the use-authority determination unit 106 (Step S100). Next, the use-authority determination unit 106 requests the app management unit 103 to provide the function information on each of the operation apps installed in the operating device 100 (Step S101).

The app management unit 103 then acquires the function information from all the operation apps (the first app 102a and the second app 102b) installed in the operating device 100 (Steps S102, S103). The app management unit 103 then sends, to the use-authority determination unit 106, the function information acquired from each of the operation apps (Step S104). The use-authority determination unit 106 writes the acquired function information in the function-information storage unit 107. The function information is used later when the process to authenticate the operating user is performed, and it is used to determine whether the operating user has the authority to use the function provided by the operation app.

Next, when the operation is started by the user, the operation panel 101 notifies the app management unit 103 via the operation receiving unit 104 of the start of the operation (Step S110). When receiving the notification of the start of the operation, the app management unit 103 requests the use-authority determination unit 106 to perform authentication (Step S111). The use-authority determination unit 106 displays, via the display control unit 105, the authentication screen on the operation panel 101 (Step S112). Here, the authentication screen is the screen to request the operating user who operates the operation panel 101 to log in.

The operation panel 101 receives an input of the authentication information from the operating user via the authentication screen displayed on the operation panel 101. Specifically, the authentication information here is the user name and the password. The operation panel 101 sends the authentication information to the use-authority determination unit 106 (Step S113).

Next, when the use-authority determination unit 106 receives, via the operation receiving unit 104, the authentication information that is input through the operation panel 101, the use-authority determination unit 106 sends the authentication information to the authentication unit 113 in the main body device 110 and requests it to authenticate the operating user by using the authentication information (Step S114).

When receiving the authentication information, the authentication unit 113 in the main body device 110 sends an inquiry to the use-authority information management unit 112 about the use authority information (Step S115). The authentication unit 113 compares the combination of the user name and the password indicated by the authentication information acquired from the operating device 100 with the combination of the user name and the password indicated by the use authority information stored in the use-authority information storage unit 111. If they match, the authentication unit 113 determines that the authentication has succeeded. If they do not match, the authentication unit 113 determines that the authentication has failed.

The authentication unit 113 sends the authentication result to the use-authority determination unit 106 (Step S116). If the authentication has succeeded, the authentication ticket as well as the authentication result indicating that the authentication has succeeded is sent to the use-authority determination unit 106. Here, the authentication ticket includes the user name and password indicated by the authentication information and includes the use authority information. The use authority information included in the authentication ticket is the use authority information that is in the use-authority information storage unit 111 and that is related to the user name indicated by the authentication information.

Figure 5:
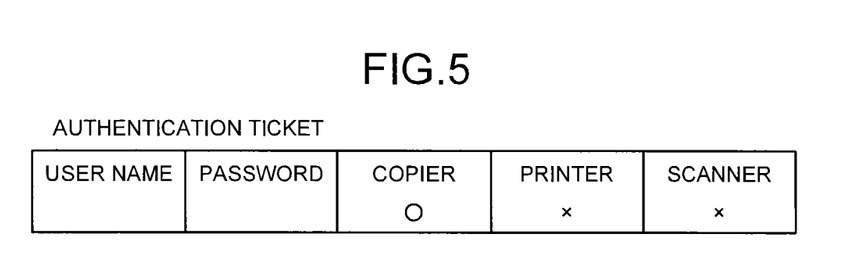
FIG. 5 is a diagram that illustrates the data structure of an authentication ticket.

FIG. 5 is a diagram that illustrates the data structure of the authentication ticket. As illustrated in FIG. 5, the authentication ticket includes the user name, the password, and the use authority information on the operating user with respect to each provided function of the main body device. The authentication ticket is held by the use-authority determination unit 106 until a log-out instruction is received from the operating user.

An explanation is given below of the process performed when the authentication of the operating user has succeeded. If the authentication has failed, the use-authority determination unit 106 displays on the operation panel 101 that the authentication has failed, and the process terminates. If the authentication has succeeded, the use-authority determination unit 106 terminates the display of the authentication screen via the display control unit 105 and causes the operation panel 101 to display the operation page where an operation is received from the operating user (Step S117).

The use-authority determination unit 106 also notifies the app management unit 103 that the authentication has succeeded (Step S118). Furthermore, the use-authority determination unit 106 identifies the operation app that can be operated by the operating user in accordance with the authentication ticket and the function information stored in the function-information storage unit 107 and then notifies the app management unit 103 of the identified operation app that can be used (Step S119).

Specifically, the use-authority determination unit 106 compares the main body function that the user has the authority to use with the provided function, the main body function being indicated by the authentication ticket and the provided function being indicated by the function information on each operation app that is stored in the function-information storage unit 107. If the provided function matches the main body function, the use-authority determination unit 106 determines that the operating user has the authority to use the operation app. That is, if the operating user has the authority to use the main body function that matches the provided function of the operation app, the use-authority determination unit 106 determines that the operating user has the authority to use the operation app. In a case where the operation app has multiple provided functions, if any of the provided functions of the operation app matches the main body function, the use-authority determination unit 106 determines that the operating user has the authority to use the operation app.

Conversely, if the provided function that is indicated by the function information on the operation app does not match the main body function that the operating user has the authority to use and that is indicated by the authentication ticket, the use-authority determination unit 106 determines that the operating user does not have the authority to use the operation app. That is, the use-authority determination unit 106 determines that the operating user does not have the authority to use the operation app if the operating user does not have the authority to use the main body function that matches the provided function of the operation app.

In accordance with the details of the notification made by the use-authority determination unit 106, the app management unit 103 notifies each of the operation apps (the first app 102a, the second app 102b) whether the operating user is allowed to use each of the operation apps (the first app 102a, the second app 102b) (Steps S120, S121).

Next, the display control unit 105 displays, on the operation panel 101, the display screen that includes the icon for selecting the operation app installed in the operating device 100. When the operating user selects a predetermined icon, the operation receiving unit 104 receives an instruction to start up the operation app selected on the operation panel 101. The operation panel 101 then instructs the app management unit 103 to start up the operation app via the operation receiving unit 104 (Step S130). The start-up instruction includes the information for instructing the start-up and also includes the app ID of the operation app that is the target of the start-up instruction.

The app management unit 103 identifies the operation app that is the target of the start-up instruction by using the app ID included in the start-up instruction. The app management unit 103 then requests the identified operation app to be started up (Step S131). FIG. 4 illustrates a case where the instruction to start up the first app 102a is received. That is, the app management unit 103 requests the first app 102a to be started up at Step S131.

The operation app (the first app 102a in the example of FIG. 4), which has received the start-up request, determines whether the operation app is to be started up in accordance with the notification indicating whether the operating user is allowed to use it or not, the notification having been received during the start-up. The information as to whether the operation app is started up or not is sent to the operation panel 101 via the display control unit 105 (Step S132).

If the operation app is not started up, the display control unit 105 displays, on the operation panel 101, information, such as an error message, to notify the operating user that the operation app, for which the start-up instruction has been made, is not started up. If the operation app is started up, the normal display is maintained. If the operation app (the first app 102a), for which the start-up request has been received, determines that it is to be started up, the operation app is actually started up, and a function of the operation app is performed. Thus, the process is completed.

Thus, in the image forming system 1 according to the first embodiment, it is possible to set the authority to use the operation app by using the operating device 100 without requiring determination of the main body device 110, i.e., without applying loads to the main body device 110. That is, the image forming system 1 makes it possible to efficiently set the authority to use the operation app.

Furthermore, in the image forming system 1 according to the present embodiment, a determination on the authority to use the operation app is made on the basis of the authority of use that is set for each user with respect to the main body function. That is, the image forming system 1 makes it possible to appropriately set the authority to use the provided function of the operating device.

In another example of the image forming system 1 according to the first embodiment, when the display control unit 105 displays the icons of the operation apps on the operation panel 101 after the process is performed at Steps S120 and S121 that are explained with reference to FIG. 4, the display control unit 105 may display the icon of the operation app that can be used by the operating user with the normal brightness (first brightness) and display the icon of the operation app that cannot be used by the operating user with second brightness that is lower (darker) than the normal brightness. Furthermore, in this case, if the operating user selects the operation app that cannot be used by the operating user, the app management unit 103 may not start up the selected operation app. Thus, the operating user can easily understand which operation apps can be used.

Second Embodiment

Figure 6:
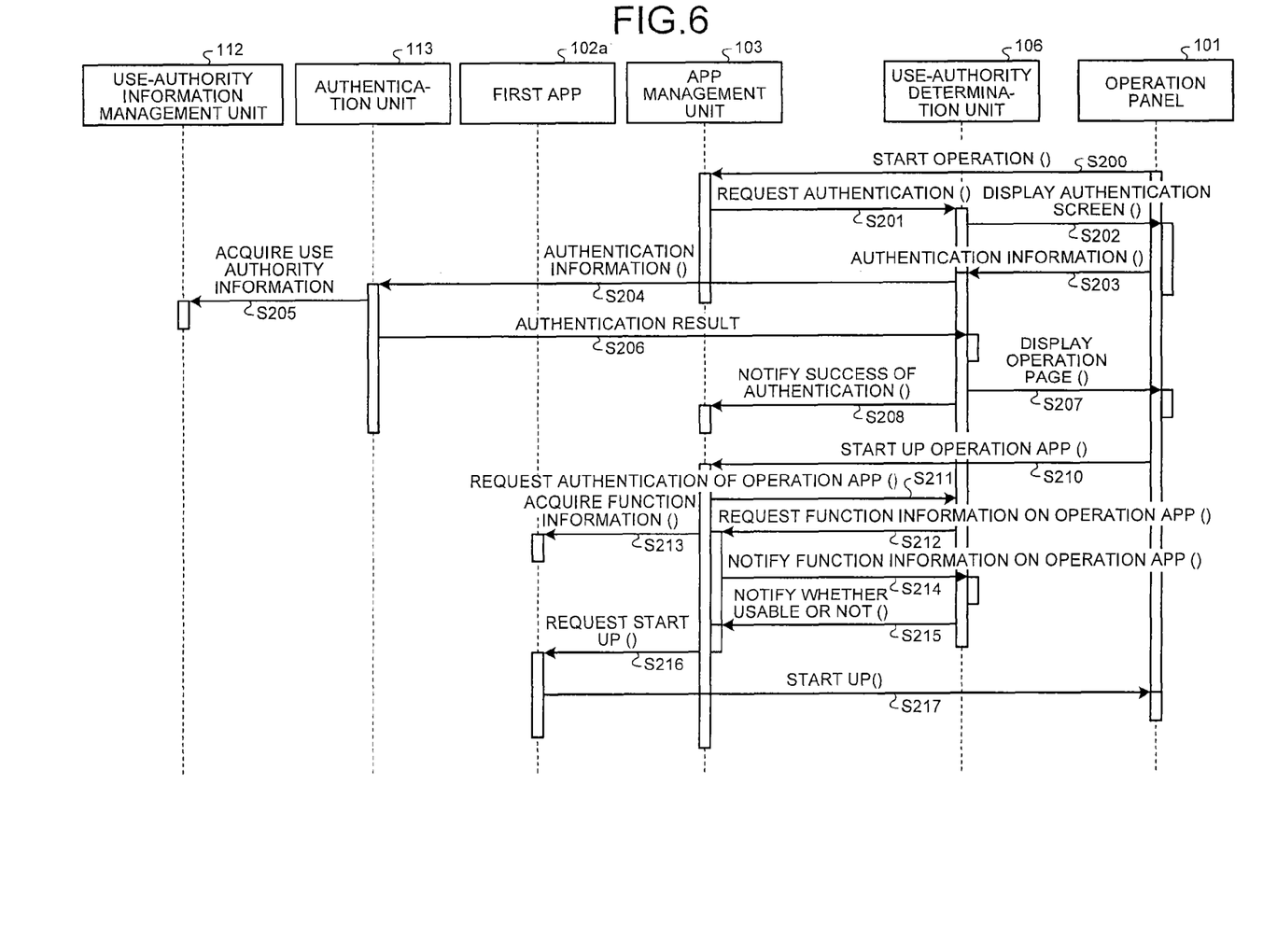
FIG. 6 is a sequence diagram that illustrates the process performed by an image forming system according to a second embodiment.

Next, an explanation is given of the image forming system 1 according to a second embodiment. FIG. 6 is a sequence diagram that illustrates the process performed by the image forming system 1 according to the second embodiment. The image forming system 1 according to the second embodiment does not perform the process from Step S100 to Step S104 that are illustrated with reference to FIG. 4. Specifically, the image forming system 1 according to the second embodiment does not perform the process to acquire, from each of the operation apps installed in the operating device 100, the function information on the operation app and the process to write it in the function-information storage unit 107.

As illustrated in FIG. 6, in the image forming system 1 according to the second embodiment, when the operation is started by the user, the operation panel 101 notifies the app management unit 103 via the operation receiving unit 104 that the operation has been started (Step S200). The subsequent process from Step S201 to Step S208 is the same as that from Step S111 to Step S118 that are explained with reference to FIG. 4.

When the operation panel 101 is operated by the operating user and when the operation panel 101 instructs the app management unit 103 via the operation receiving unit 104 to start up a predetermined operation app (Step S210), the app management unit 103 requests the use-authority determination unit 106 to authenticate the target operation app that is the target of the start-up instruction (Step S211). Here, an explanation is given of a case where the instruction to start up the first app 102a is indicated.

The use-authority determination unit 106 then requests the function information on the target operation app (the first app 102a) from the app management unit 103 (Step S212). The app management unit 103 then acquires the provided function from the target operation app (the first app 102a) (Step S213) and notifies it to the use-authority determination unit 106 (Step S214).

The use-authority determination unit 106 determines whether the operating user has the authority to use the target operation app, for which the start-up instruction has been made, in accordance with the authentication ticket acquired from the main body device 110 at Step S206 and the function information on the target operation app.

Specifically, the use-authority determination unit 106 refers to the authentication ticket so as to identify the main body function which the operating user has the authority to use. The use-authority determination unit 106 also refers to the provided function information on the target operation app so as to identify the provided function of the target operation app. The use-authority determination unit 106 determines that the operating user has the authority to use the target operation app if the provided function of the target operation app matches the main body function which the operating user has the authority to use.

In a case where the target operation app has multiple provided functions, the use-authority determination unit 106 determines that the operating user has the authority to use the target operation app if any of the provided functions of the target operation app matches the main body function. Furthermore, the use-authority determination unit 106 determines that the operating user does not have the authority to use the target operation app if the provided functions of the target operation app do not match the main body functions.

Next, the use-authority determination unit 106 notifies the app management unit 103 whether the operating user can use the target operation app (Step S215). When receiving the notification that the target operation app is allowed to be used, the app management unit 103 requests the first app 102a that is the target operation app to be started up (Step S216). When the first app 102a is started up, the notification that the first app 102a has been started up is made to the display control unit 105 (Step S217), and the display control unit 105 displays, on the operation panel 101, the operation page that is obtained after the start-up. If the app management unit 103 receives the notification that the target operation app is not allowed to be used, the app management unit 103 does not request the first app 102a that is the target operation app to be started up but does displays an error on the operation panel 101 via the display control unit 105.

Thus, in the image forming system 1 according to the second embodiment, it is not determined whether the operating user has the authority to use the operation app until the operating user inputs the start-up instruction. When the start-up instruction is input, it is determined whether the operating user has the authority to use the target operation app for which the start-up instruction is made. Thus, it is possible to improve processing efficiency. Furthermore, there is no need to read the function information on all the operation apps installed in the operating device 100 and to store it in the function-information storage unit 107 like the image forming system 1 according to the first embodiment does. Thus, it is possible to reduce memory utilization.

Other configurations and processes of the image forming system 1 according to the second embodiment are the same as those of the image forming system 1 according to the first embodiment.

In another example of the image forming system 1, when the operation receiving unit 104 receives, in response to the operation of the operating user, an instruction to display the operation page that is used for inputting the instruction to execute a predetermined operation app, the display may be restricted depending on whether the operating user has the authority to use it or not.

Figure 7:
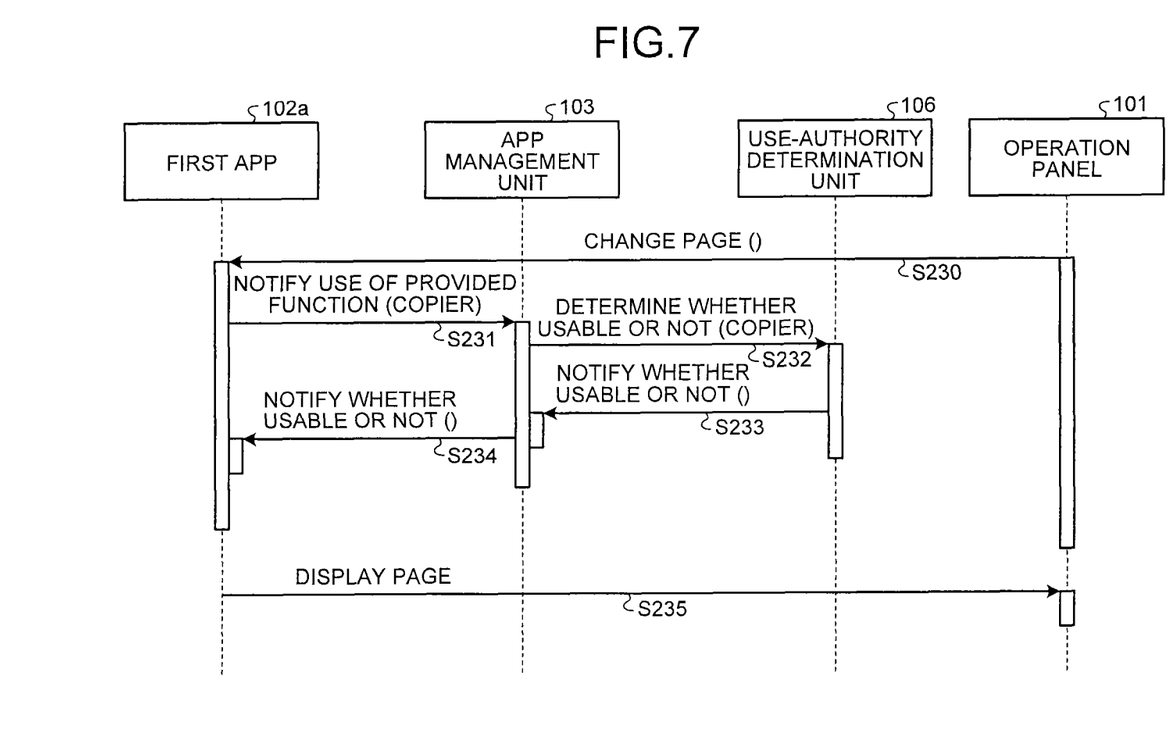
FIG. 7 is a sequence diagram that illustrates the process according to another example.

FIG. 7 is a sequence diagram that illustrates the process according to the present example. The process illustrated in FIG. 7 is the process performed after the operation page is displayed at Step S217 illustrated in FIG. 6. When the instruction to display the provided-function execution page is input in response to the operation of the operating user while the operation page is displayed on the operation panel 101, the operation receiving unit 104 receives the display instruction. Here, the provided-function execution page is the operation page where it is possible to instruct the execution of a predetermined provided function by the user operation among the provided functions of the running operation app. The provided-function execution page is, for example, the page that includes a reception button for receiving the instruction to execute a provided function.

When the display instruction has been input, the operation panel 101 requests the currently-running operation app via the operation receiving unit 104 to change the page into the one corresponding to the display instruction (Step S230). Here, an explanation is given of a case where the instruction to display the provided-function execution page related to the printer function of the first app 102a has been input. That is, at Step S230, the first app 102a, which is the running operation app, is requested to change the page.

Next, the first app 102a notifies the app management unit 103 of "copier" that is the provided function that can be provided by the first app 102a (Step S231). The app management unit 103 then notifies the use-authority determination unit 106 of the information on the provided function "copier" and also instructs the use-authority determination unit 106 to determine whether it can be used or not (Step S232).

The use-authority determination unit 106 compares the main body function indicated by the authentication ticket with the notified provided function so as to determine whether the operating user has the authority to use the notified provided function. The use-authority determination unit 106 then notifies the app management unit 103 whether the operating user can use the provided function that is executed on the provided-function execution page (Step S233).

Next, the app management unit 103 notifies the first app 102a of the result of the determination as to whether the provided function can be used (Step S234). When receiving the notification of the result of the determination as to whether the provided function can be used, the first app 102a displays, on the operation panel 101 via the display control unit 105, the provided-function execution page for which the display instruction has been made (Step S235).

If the first app 102a receives the notification of the determination result indicating that the provided function is not allowed to be used, the first app 102a does not display the provided-function execution page for which the display instruction has been made. In this case, the first app 102a may display, on the operation panel 101 via the display control unit 105, the image for notifying an error to the operating user.

Thus, according to the present example, if the operation app has multiple provided functions, it is determined whether the operating user has the authority to use each of the provided functions. In accordance with the result of the determination, it is possible to limit the usage of the operating user on a per-provided-function basis.

Although the present invention has been explained above by using the embodiment, various changes or modifications may be added to the above-described embodiment.

A first modified example will be explained below. In the image forming system 1 according to the embodiment, it is determined that the operating user has the authority to use the operation app if the provided function of the operation app matches the main body function indicated by the authentication ticket for the operating user; however, the operating device 100 may determine whether the operating user has the authority to use the operation app on the basis of the main body functions indicated by the authentication ticket for the operating user, and the specific conditions for determination are not limited to that in the embodiment.

Figure 8:
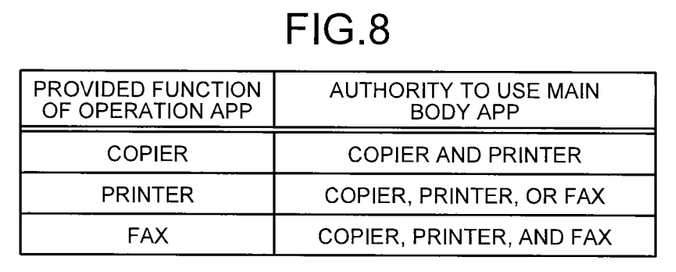
FIG. 8 is a diagram that illustrates the conditions for determination made by a use-authority determination unit according to a first modified example.

FIG. 8 is a diagram that illustrates the conditions for determination made by the use-authority determination unit 106 according to the first modified example. In the example illustrated in FIG. 8, the use-authority determination unit 106 determines that the operating user has the authority to use the provided function "copier" of the operation app if the authentication ticket for the operating user indicates that the operating user has the authority to use both the "copier" and "printer" of the main body app. Furthermore, the use-authority determination unit 106 determines that the operating user has the authority to use the provided function "printer" of the operation app if the authentication ticket of the operating user indicates that the operating user has the authority to use any of the "copier", "printer", and "fax" of the main body app. Moreover, the use-authority determination unit 106 determines that the operating user has the authority to use the provided function "fax" of the operation app if the authentication ticket for the operating user indicates that the operating user has the authority to use all of the "copier", "printer", and "fax" of the main body app.

Thus, the administrator, or the like, can arbitrarily set the relation between the authority to use the main body app and the authority to use the operation app.

The conditions for determination may be set for each operation app by the administrator, or the like, by using the operation panel 101. That is, the administrator, or the like, can make secure settings for each operation app so as to limit the users who can use the operation app.

A second modified example will be explained below. In the embodiment, the provided function of the operation app is the same as that of the main body app; however, it may be determined, on the basis of the main body function indicated by the authentication ticket for the operating user, whether the operating user has the authority to use the provided function that is not present in the main body.

Figure 9:
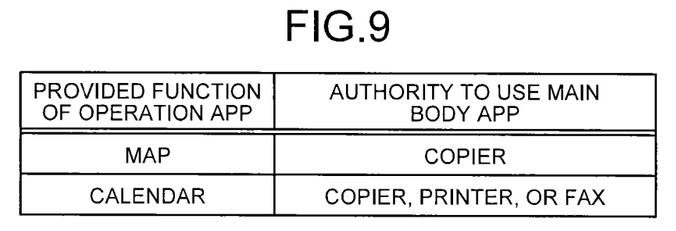
FIG. 9 is a diagram that illustrates the conditions for determination made by the use-authority determination unit according to a second modified example.

FIG. 9 is a diagram that illustrates the conditions for determination made by the use-authority determination unit 106 according to the second modified example. In the example illustrated in FIG. 9, the use-authority determination unit 106 determines that the operating user has the authority to use the provided function "map" of the operation app if the authentication ticket for the operating user indicates that the operating user has the authority to use the "copier" of the main body app. Furthermore, the use-authority determination unit 106 determines that the operating user has the authority to use the provided function "calendar" of the operation app if the authentication ticket of the operating user indicates that the operating user has the authority to use any of the "copier", "printer", and "fax" of the main body app.

The operating device 100 and the main body device 110 according to the present embodiment include a control device, such as a CPU, a storage device, such as a ROM (read only memory) or a RAM, an external storage device, such as an HDD or CD drive device, a display device, such as a display, and an input device, such as a keyboard or mouse; thus, they have the hardware configuration that uses the typical computer.

The program to be executed by the operating device 100 and the main body device 110 according to the present embodiment is provided by being stored, in the form of a file that is installable and executable, in a recording medium readable by a computer, such as a CD-ROM, flexible disk (FD), CD-R, or a digital versatile disk (DVD).

Furthermore, a configuration may be such that the program to be executed by the operating device 100 and the main body device 110 according to the present embodiment is stored in a computer connected via a network such as the Internet and provided by being downloaded via the network. Moreover, a configuration may be such that the program to be executed by the operating device 100 and the main body device 110 according to the present embodiment is provided or distributed via a network such as the Internet. A configuration may be such that the program according to the present embodiment is provided such that it is installed in the ROM, or the like, in advance.

The program to be executed by the operating device 100 and the main body device 110 according to the present embodiment has a modular configuration that includes the above-described units. In terms of actual hardware, the CPU (processor) reads the program from the above-described storage medium and executes the read program so as to load the above-described units into a main storage device so that each of the units is generated in the main storage device.

Although an explanation is given of the image forming system in the above-described embodiment, any image forming apparatuses, such as multifunction peripherals, copiers, printers, scanners, facsimile machines, or the like, are applicable if they have at least two functions out of copier, printer, scanner, and facsimile functions.

According to the present invention, it is possible to efficiently and appropriately set the restriction on the use of the application installed in the operating device without the need of control performed by the controller in the device main body.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing system including an operating device, the operating device receiving an operation from a user, the image processing system comprising:
   an image processing main body device that performs image processing in response to an operation received by the operating device, the image processing main body device including
   a use-authority information storage device that stores therein user identification information for identifying a pre-registered user and that stores therein use authority information that indicates whether the user has authority to use a main body function provided by a main body application program installed in the image processing main body device, the user identification information being related to the use authority information, and the main body function being a function directly associated with the image processing main body device, wherein
   the operating device includes circuitry that
      acquires, from an operation application program installed in a corresponding operation management device, function information that indicates a provided function provided by the operation application program, the provided function being a function not directly associated with the image processing main body device,
      acquires the use authority information that is stored in the use-authority information storage device and is related to the user identification information on an operating user that operates the operating device,
      determines whether the operating user has authority to use the provided function, which is not directly associated with the image processing main body device and is provided by the operation application program, based on stored correspondence information indicating correspondence between a provided function, which is not directly associated with the image processing main body device, and one or more main body functions, which are directly associated with the image processing main body device and are provided by the main body application program, by using the acquired use authority information associated with the main body function, which is directly associated with the image processing main body device and is provided by the main body application program, and the acquired function information associated with the provided function, which is not directly associated with the image processing main body device and is provided by the operation application program, and
      performs the provided function, which is not directly associated with the image processing main body device, when the operating user has the authority to use the provided function,
   wherein
      the provided function, which is not directly associated with the image processing main body device and is provided by the operation application program corresponds to a map function or a calendar function, and
      the one or more main body functions, which are directly associated with the image processing main body device and are provided by the main body application program correspond to one or more of a copy function, a print function, a scan function, or a facsimile function.

2. The image processing system according to claim 1, wherein the circuitry determines that the operating user has the authority to use the provided function of the operation application program when the provided function that is indicated by the function information on the operation application program matches the main body function that is indicated by the use authority information on the operating user and that the operating user has the authority to use.

3. The image processing system according to claim 1, wherein the circuitry
acquires the function information when a corresponding image processing apparatus is started up, and
determines, when the function information is acquired, whether the operating user has the authority to use the provided function provided by the operation application program.

4. The image processing system according to claim 1, wherein the circuitry
acquires the function information when the operating device receives, from the operating user, an instruction to execute the provided function of the operation application program, and
determines, when the function information is acquired, whether the operating user has the authority to use the provided function, the instruction to execute the provided function having been made.

5. The image processing system according to claim 1, wherein the circuitry further displays, on a display device, a page image associated with the operation application program, and
in accordance with a result of a determination as to whether the operating user has the authority to use the provided function, the circuitry allows display of the page image associated with the provided function that the operating user has the authority to use, and prevents displaying of the page image associated with the provided function that the operating user does not have the authority to use.

6. The image processing system according to claim 3, wherein the circuitry further displays, on a display device, a selection button for receiving an instruction to execute each of a plurality of provided functions of the operation application program,
in accordance with a result of a determination as to whether the operating user has the authority to use the provided function, the circuitry displays, with first brightness, the selection button for the provided function that the operating user has the authority to use, and displays, with second brightness lower than the first brightness, the selection button for the provided function that the operating user does not have the authority to use, and
the circuitry performs the provided function corresponding to the selection button when the operating device receives, from the operating user, selection of the selection button with the first brightness and does not perform the provided function corresponding to the selection button when the operating device receives, from the operating user, selection of the selection button with the second brightness.

7. An operating device that receives an operation from a user and notifies the operation to a main body device, the operating device comprising:
circuitry that
acquires, from an operation application program installed in the operating device, function information that indicates a provided function provided by the operation application program, the provided function being a function not directly associated with the main body device,
acquires use authority information that is stored in a use-authority information storage device and is related to user identification information on an operating user that operates the operating device, the use-authority information storage device being included in the main body device, and the use-authority information storage device storing therein the user identification information for identifying a pre-registered user and storing therein the use authority information that indicates whether the user has authority to use a main body function provided by a main body application program installed in the main body device, the user identification information being related to the use authority information, and the main body function being a function directly associated with the main body device,
determines whether the operating user has authority to use the provided function, which is not directly associated with the main body device and is provided by the operation application program, based on stored correspondence information indicating correspondence between a provided function, which is not directly associated with the main body device, and one or more main body functions, which are directly associated with the main body device and are provided by the main body application program, by using the acquired use authority information associated with the main body function, which is directly associated with the main body device and is provided by the main body application program, and the acquired function information associated with the provided function, which is not directly associated with the main body device and is provided by the operation application program, and
performs the provided function, which is not directly associated with the main body device, when the operating user has the authority to use the provided function,
wherein
the provided function, which is not directly associated with the main body device and is provided by the operation application program corresponds to a map function or a calendar function, and
the one or more main body functions, which are directly associated with the main body device and are provided by the main body application program correspond to one or more of a copy function, a print function, a scan function, or a facsimile function.

8. A non-transitory computer-readable storage medium containing an executable program for a computer that receives an operation from a user and notifies the operation to a main body device, the program causing the computer to perform a method, the method comprising:
acquiring, from an operation application program installed in the computer, function information that indicates a provided function provided by the operation application program, the provided function being a function not directly associated with the main body device;
acquiring use authority information that is stored in a use-authority information storage device and is related to user identification information on an operating user that operates the operating device, the use-authority information storage device being included in the main body device, and the use-authority information storage device storing therein the user identification information for identifying a pre-registered user and storing therein the use authority information that indicates whether the user has authority to use a main body function provided by a main body application program installed in the main body device, the user identification information being related to the use authority information, and the main body function being a function directly associated with the main body device;

determining whether the operating user has authority to use the provided function, which is not directly associated with the main body device and is provided by the operation application program, based on stored correspondence information indicating correspondence between a provided function, which is not directly associated with the main body device, and one or more main body functions, which are directly associated with the main body device and are provided by the main body application program, by using the acquired use authority information associated with the main body function, which is directly associated with the main body device and is provided by the main body application program, and the acquired function information associated with the provided function, which is not directly associated with the main body device and is provided by the operation application program; and performing the provided function, which is not directly associated with the main body device, when the operating user has the authority to use the provided function, wherein the provided function, which is not directly associated with the main body device and is provided by the operation application program corresponds to a map function or a calendar function, and the one or more main body functions, which are directly associated with the main body device and are provided by the main body application program correspond to one or more of a copy function, a print function, a scan function, or a facsimile function.

9. The image processing system according to claim 1, wherein the one or more main body functions provided by the main body application program correspond to functions of a multifunction peripheral (MFP).

* * * * *